(12) United States Patent
Vigen et al.

(10) Patent No.: US 11,718,370 B2
(45) Date of Patent: Aug. 8, 2023

(54) SPINDLE AND SUSPENSION SYSTEM FOR RECREATIONAL VEHICLES

(71) Applicant: Arctic Cat Inc., Thief River Falls, MN (US)

(72) Inventors: David L. Vigen, Thief River Falls, MN (US); Guy L. Sibilleau, Roseau, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 110 days.

(21) Appl. No.: 16/839,440

(22) Filed: Apr. 3, 2020

(65) Prior Publication Data

US 2020/0231250 A1 Jul. 23, 2020

Related U.S. Application Data

(62) Division of application No. 15/496,815, filed on Apr. 25, 2017, now Pat. No. 10,647,384.
(Continued)

(51) Int. Cl.
*B62M 27/02* (2006.01)
*B60R 25/34* (2013.01)
(Continued)

(52) U.S. Cl.
CPC .............. *B62M 27/02* (2013.01); *B60G 3/01* (2013.01); *B60G 3/20* (2013.01); *B60G 3/24* (2013.01); *B60G 3/265* (2013.01); *B60G 7/008* (2013.01); *B60G 7/02* (2013.01); *B60G 13/006* (2013.01); *B60G 15/062* (2013.01); *B60G 15/07* (2013.01); *B60G 17/005* (2013.01); *B60G 21/05* (2013.01); *B60K 17/306* (2013.01); *B60R 25/00* (2013.01); *B60R 25/04* (2013.01); *B60R 25/102* (2013.01); *B60R 25/23* (2013.01); *B60R 25/302* (2013.01); *B60R 25/34* (2013.01); *B60T 1/065* (2013.01); *B62D 7/18* (2013.01); *B62D 9/02* (2013.01);
(Continued)

(58) Field of Classification Search
CPC . B62M 27/02; B62M 2027/026; B60R 25/34; B60R 25/102; B60R 25/302; B60R 25/23; B60R 25/04; B60R 25/00; B62D 9/02; B62D 7/18; B60G 15/07; B60G 13/006; B60G 7/008; B60G 3/24; B60G 15/062; B60G 3/265; B60G 7/02; B60G 3/20; B60G 3/01; B60G 17/005; B60G 21/05; B60T 1/065; B62L 1/00; B62J 35/00; B60K 17/306
See application file for complete search history.

(56) References Cited

U.S. PATENT DOCUMENTS 2,637,568 A  5/1953  Booth
3,408,124 A  10/1968  Melton
(Continued)

*Primary Examiner* — Kevin Hurley
*Assistant Examiner* — Marlon A Arce
(74) *Attorney, Agent, or Firm* — Billion & Armitage

(57) ABSTRACT

Embodiments of the present invention describe a recreational vehicle spindle, including a spindle body having one or more sockets in the spindle body, and an upper attachment mechanism in contact with the spindle body and adapted to attach to a steering component. The spindle also includes a lower attachment mechanism in contact with the spindle body and adapted to attach to a ski or wheel. The one or more sockets are adapted to each receive a ball and stud forming one or more ball joints.

9 Claims, 15 Drawing Sheets

Related U.S. Application Data

(60) Provisional application No. 62/327,022, filed on Apr. 25, 2016.

(51) Int. Cl.

| | | |
|---|---|---|
| *B62D 9/02* | (2006.01) | |
| *B60G 15/07* | (2006.01) | |
| *B60G 13/00* | (2006.01) | |
| *B60T 1/06* | (2006.01) | |
| *B60G 7/00* | (2006.01) | |
| *B60R 25/102* | (2013.01) | |
| *B60R 25/30* | (2013.01) | |
| *B60R 25/23* | (2013.01) | |
| *B60G 3/24* | (2006.01) | |
| *B60R 25/04* | (2013.01) | |
| *B60G 15/06* | (2006.01) | |
| *B62L 1/00* | (2006.01) | |
| *B60G 3/26* | (2006.01) | |
| *B60R 25/00* | (2013.01) | |
| *B62J 35/00* | (2006.01) | |
| *B60G 7/02* | (2006.01) | |
| *B60G 3/20* | (2006.01) | |
| *B60G 3/01* | (2006.01) | |
| *B60G 17/005* | (2006.01) | |
| *B60K 17/30* | (2006.01) | |
| *B60G 21/05* | (2006.01) | |
| *B62D 7/18* | (2006.01) | |

(52) U.S. Cl.
CPC ............... *B62J 35/00* (2013.01); *B62L 1/00* (2013.01); *B62M 2027/026* (2013.01)

(56) References Cited

U.S. PATENT DOCUMENTS

| | | | |
|---|---|---|---|
| 3,472,331 A | 10/1969 | Baker | |
| 3,492,018 A | 1/1970 | Burckhardt et al. | |
| 3,620,548 A | 11/1971 | Friedrich | |
| 4,341,396 A | 7/1982 | Decouzon | |
| 4,372,418 A | 2/1983 | Dangel | |
| 4,601,603 A * | 7/1986 | Nakayama | F16C 11/069 403/321 |
| 5,029,664 A | 7/1991 | Zulawski | |
| 5,038,882 A | 8/1991 | Zulawski | |
| 5,380,114 A | 1/1995 | Urbach | |
| 5,931,597 A | 8/1999 | Urebach | |
| 6,009,966 A | 1/2000 | Olson et al. | |
| 6,149,198 A * | 11/2000 | Klaas | B60G 7/001 280/124.108 |
| 6,234,262 B1 | 5/2001 | Moore | |
| 7,410,182 B1 | 8/2008 | Giese | |
| 8,037,961 B2 | 10/2011 | Fecteau | |
| 8,757,648 B1 * | 6/2014 | Winter | B60G 7/005 403/77 |
| 8,851,785 B1 * | 10/2014 | Belleau | F16C 11/069 403/135 |
| 8,944,204 B2 * | 2/2015 | Ripley | B62K 19/22 180/190 |
| 9,090,313 B2 | 7/2015 | Bedard | |
| 9,540,072 B2 | 1/2017 | Hedulnd | |
| 2002/0017765 A1 | 2/2002 | Mallette et al. | |
| 2006/0032686 A1 | 2/2006 | Berg | |
| 2007/0193799 A1 | 8/2007 | Yoshihara | |
| 2011/0115180 A1 | 5/2011 | Polakowski | |
| 2011/0132679 A1 | 6/2011 | Kerner | |
| 2011/0278083 A1 | 11/2011 | Yoshihara | |
| 2012/0174388 A1 * | 7/2012 | Shen | B25B 27/062 29/724 |
| 2013/0032417 A1 * | 2/2013 | Sampson | B62K 19/22 180/182 |
| 2014/0265202 A1 * | 9/2014 | Bunker | B62D 7/18 280/93.512 |
| 2017/0205023 A1 * | 7/2017 | Wynalda, Jr. | A01M 31/025 |
| 2018/0311802 A1 * | 11/2018 | Kemppainen | B25D 17/005 |

\* cited by examiner

SPINDLE AND SUSPENSION SYSTEM FOR RECREATIONAL VEHICLES

CROSS REFERENCE TO RELATED APPLICATIONS

This application is a divisional of U.S. application Ser. No. 15/496,815, filed on Apr. 25, 2017, which claims benefit of U.S. Provisional Application No. 62/327,022, filed on Apr. 25, 2016 and which application is incorporated herein by reference. A claim of priority is made.

BACKGROUND

Snowmobiles are popular land vehicles used as transportation vehicles or as recreational vehicles in cold and snowy conditions. All-terrain vehicles (ATVs) are utilized in both on- and off-road recreational and productive activities. In general, a snowmobile has a chassis on or around which the various components of the snowmobile are assembled. Typical snowmobiles include skis for steering, a seat, handlebars, and an endless track for propulsion mounted to a central chassis. The engine drives a ground-engaging endless track disposed in a longitudinally extending drive tunnel. The skis serve to facilitate steering as well as to provide flotation of the front of the snowmobile over the snow in which it is operated. A handlebar assembly, positioned forward of the seat, is operatively linked to the skis for steering the snowmobile. The skis may be pivoted to steer the snowmobile, for example, by turning the handlebars.

The skis support the front of the snowmobile using a suspension system that may include suspension or connecting arms mounted to the snowmobile chassis that attach to and support a spindle.

Each spindle may be attached to a ski to form the operative link in the steering system whereby movement of the handlebars causes rotation of the spindles, which causes the skis to turn. Spindles are desired which reduce production cost and enhance the performance of a snowmobile.

Additionally, all-terrain vehicles (ATV) can utilize one or more spindles. Although this disclosure generally discusses snowmobiles, methods and structures discussed herein in the context of snowmobiles may also be used with ATVs having wheels or tires, as opposed to skis.

SUMMARY

In some embodiments, a recreational vehicle includes a spindle, including a spindle body having one or more sockets in the spindle body, and an upper attachment mechanism in contact with the spindle body and adapted to attach to a steering component. The spindle also includes a lower attachment mechanism in contact with the spindle body and adapted to attach to a ski or wheel. The one or more sockets are adapted to each receive a ball and stud forming one or more ball joints.

Embodiments describe a recreational vehicle suspension system, including one or more spindle bodies, each body having one or more sockets. Each spindle body also includes an upper attachment mechanism in contact with the spindle body and attached to one or more steering components, and a lower attachment mechanism in contact with each spindle body and attached to a ski or wheel. The system also includes one or more connecting arms in contact with a stud and ball at a distal end and forming a ball joint with each socket of the spindle body. The system also includes one or more dampening components in contact with one or more of the connecting arms and spindle body at a distal end.

Embodiments describe a recreational vehicle, including one or more spindle bodies, each body having one or more sockets. The spindle bodies each have an upper attachment mechanism in contact with the spindle body, the upper attachment mechanisms being attached to one or more steering components. A lower attachment mechanism is in contact with each spindle body and attached to a ski or wheel. The vehicle also includes one or more connecting arms in contact with a stud and ball at a distal end, forming a ball joint with each socket of the spindle body, and attached to a chassis at the proximal end. One or more dampening components in contact with one or more of the connecting arms and spindle body at a distal end and attached to the chassis at a proximal end are included. The vehicle also includes an engine mounted on the chassis, a drive track in contact with the chassis, a drive train operatively interconnecting the engine with the drive track for delivering propulsive power to the drive track, and a rear suspension system in contact with at least the chassis and drive track.

Embodiments also include a method of making a recreational vehicle spindle including forming a spindle body, forming one or more sockets in the spindle body, contacting each of the sockets with a ball, and securing the ball within each socket.

BRIEF DESCRIPTION OF DRAWINGS

This written disclosure describes illustrative embodiments that are non-limiting and non-exhaustive. Reference is made to illustrative embodiments that are depicted in the figures, in which.

DETAILED DESCRIPTION

Embodiments of the present disclosure describe a spindle, a suspension system including one or more spindles, and recreational vehicles utilizing a suspension system including one or more spindles. Examples of recreational vehicles include snowmobiles and all-terrain vehicles (ATVs). The spindle of the present disclosure includes one or more sockets of a ball joint positioned in a spindle body. Such an arrangement reduces the total number of parts in a suspension system or vehicle and lowers the cost of manufacturing. In addition, the spindle reduces the amount of free play in the ball joint, creating a more stable, reliable joint. By removing the attachment step of a ball joint to a spindle, an increased stability and rigidity is created in any connecting arm or chassis connection at the ball joint. Further, the disassembly of the suspension system is simplified as removal of the ball from the socket can be accomplished without cutting or breaking of a weld. Additionally, any connecting arms may be optionally integrated directly with the ball joint, further reducing overall part count and increasing suspension stability. As one side of the front suspension system is generally discussed, it is to be noted that the opposing side is generally a mirror image.

Figure 1A:
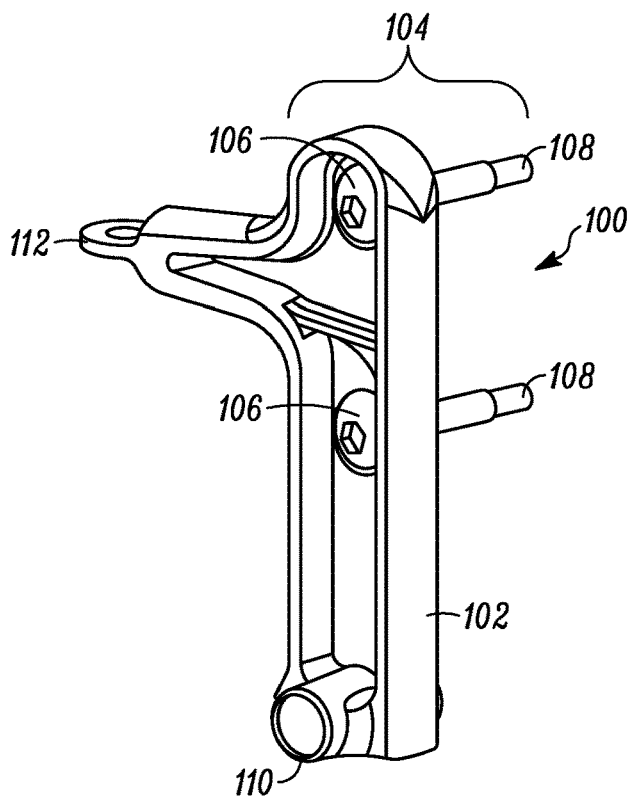
FIGS. 1A-D illustrate perspective view of a spindle, according to an embodiment of this disclosure.
Figure 1B:
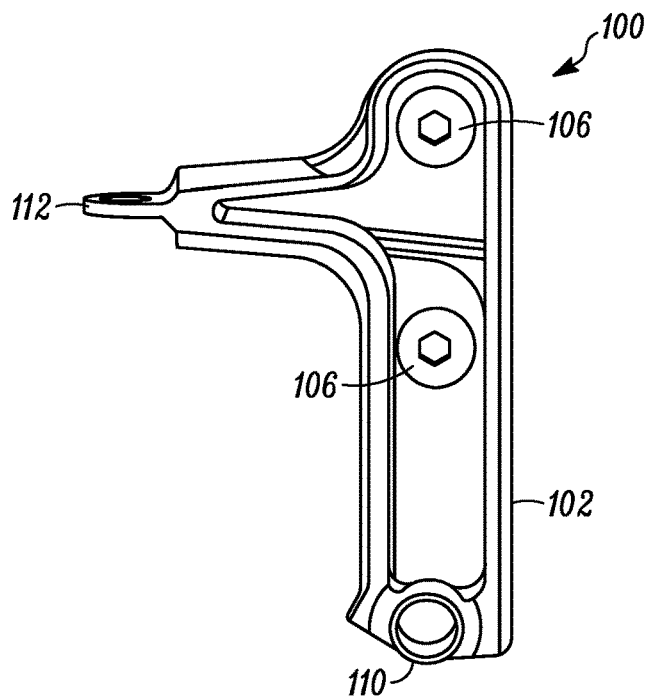
Figure 1C:
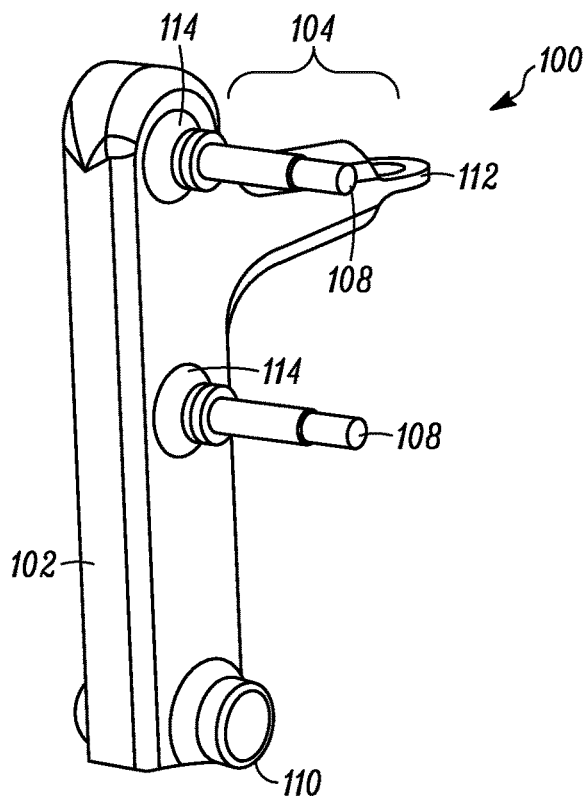
Figure 1D:
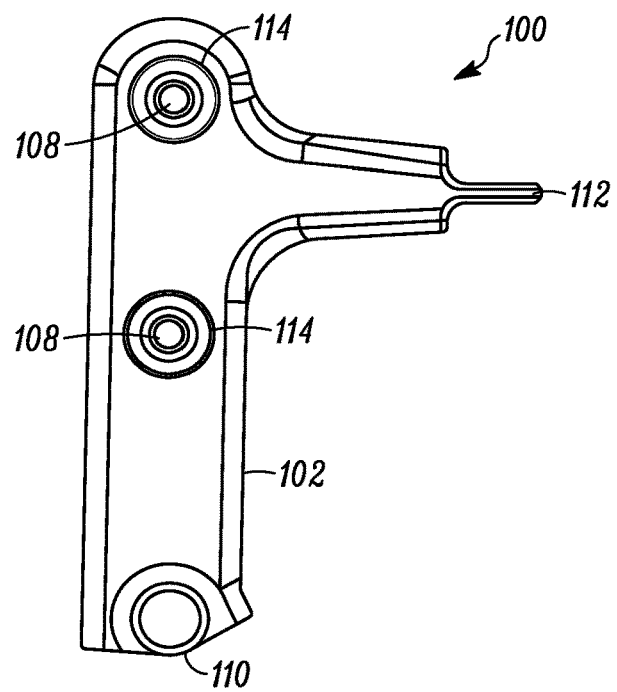
Figure 1E:
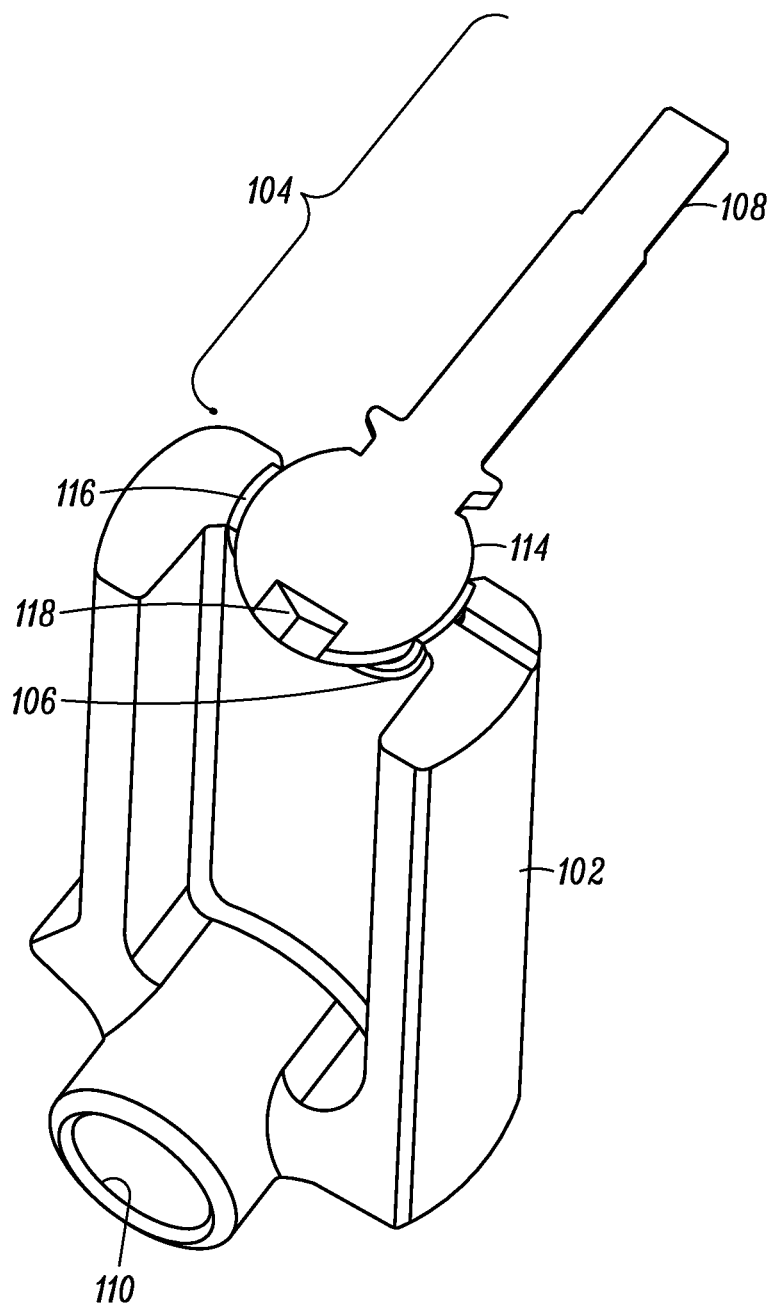
FIG. 1E illustrates a cross-sectional view of a spindle, according to an embodiment of this disclosure.

Referring to FIGS. 1A-E, perspective views of a spindle 100 are shown, according to an embodiment of this disclosure. A spindle body 102 includes one or more sockets 106 positioned in the spindle body 102. Each socket 106 is capable of receiving a ball 114 (as shown in FIGS. 1C-E) in contact with or integrated with a stud 108. The one or more sockets 106 are adapted to each receive a ball 114 and stud 108 forming one or more ball joints 104. An upper attachment mechanism 112 is in contact with the spindle body 102 and is adapted to attach to a steering component. A lower attachment mechanism 110 is in contact with the spindle body 102 and is adapted to attach to a ski. If attaching to a wheel (such as with an ATV), the attachment mechanism 110 may be positioned in a central location on the spindle body 102, such as between one or more ball joints 104. In some embodiments, the spindle body 102 is formed from a single casting for forging.

Figure 2:
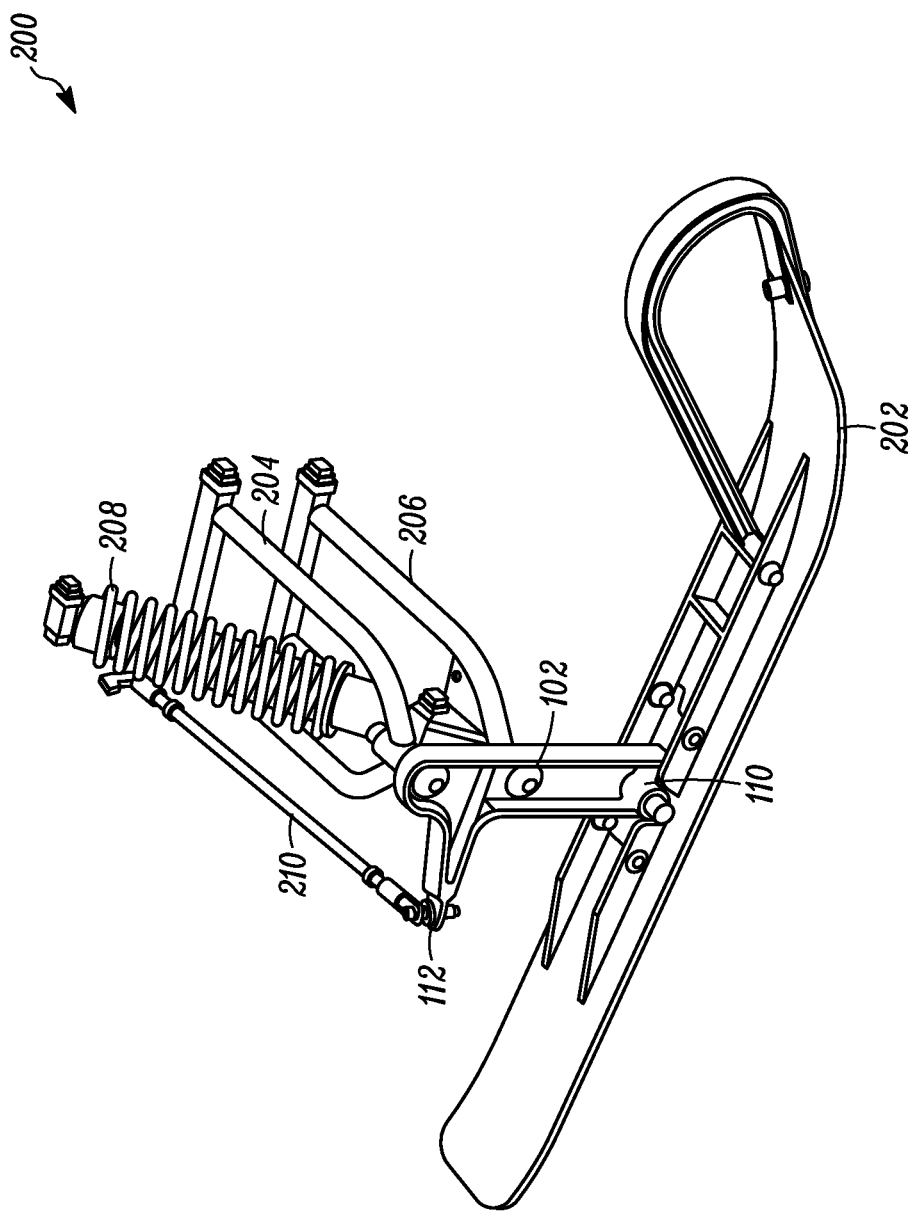
FIG. 2 illustrates a perspective view of a suspension system, according to an embodiment of this disclosure.
Figure 3A:
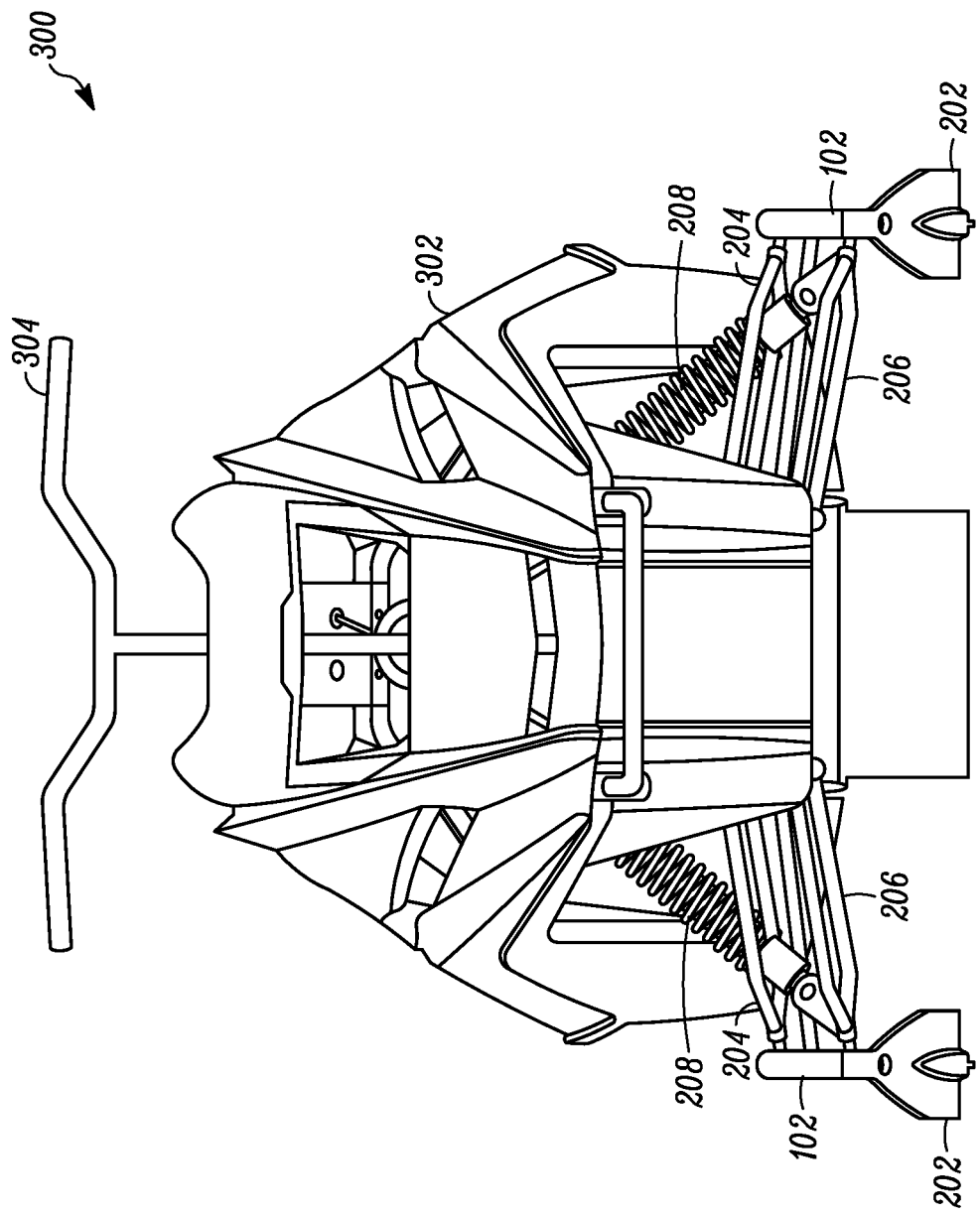
FIGS. 3A-E illustrate perspective views of a suspension system in a recreational vehicle, according to an embodiment of this disclosure.
Figure 3B:
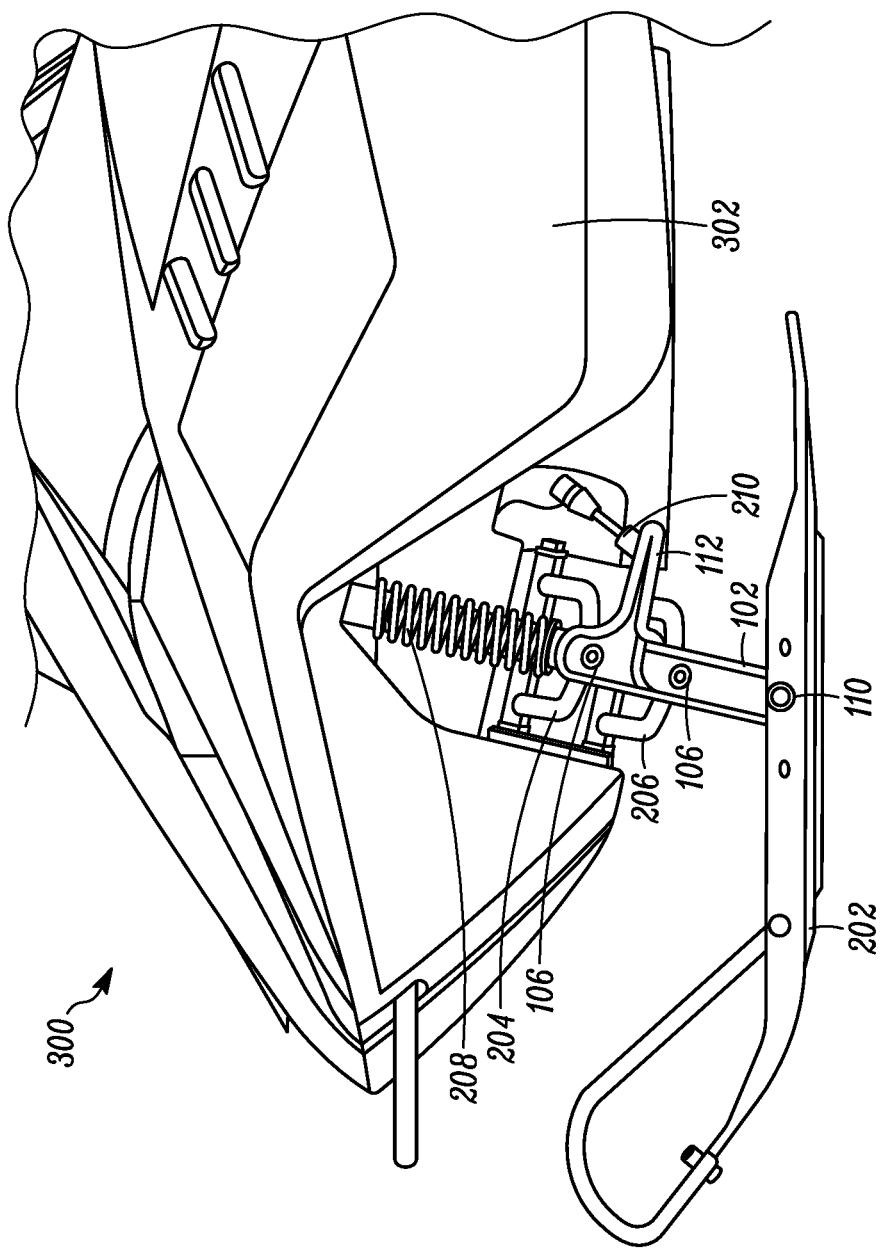
Figure 3C:
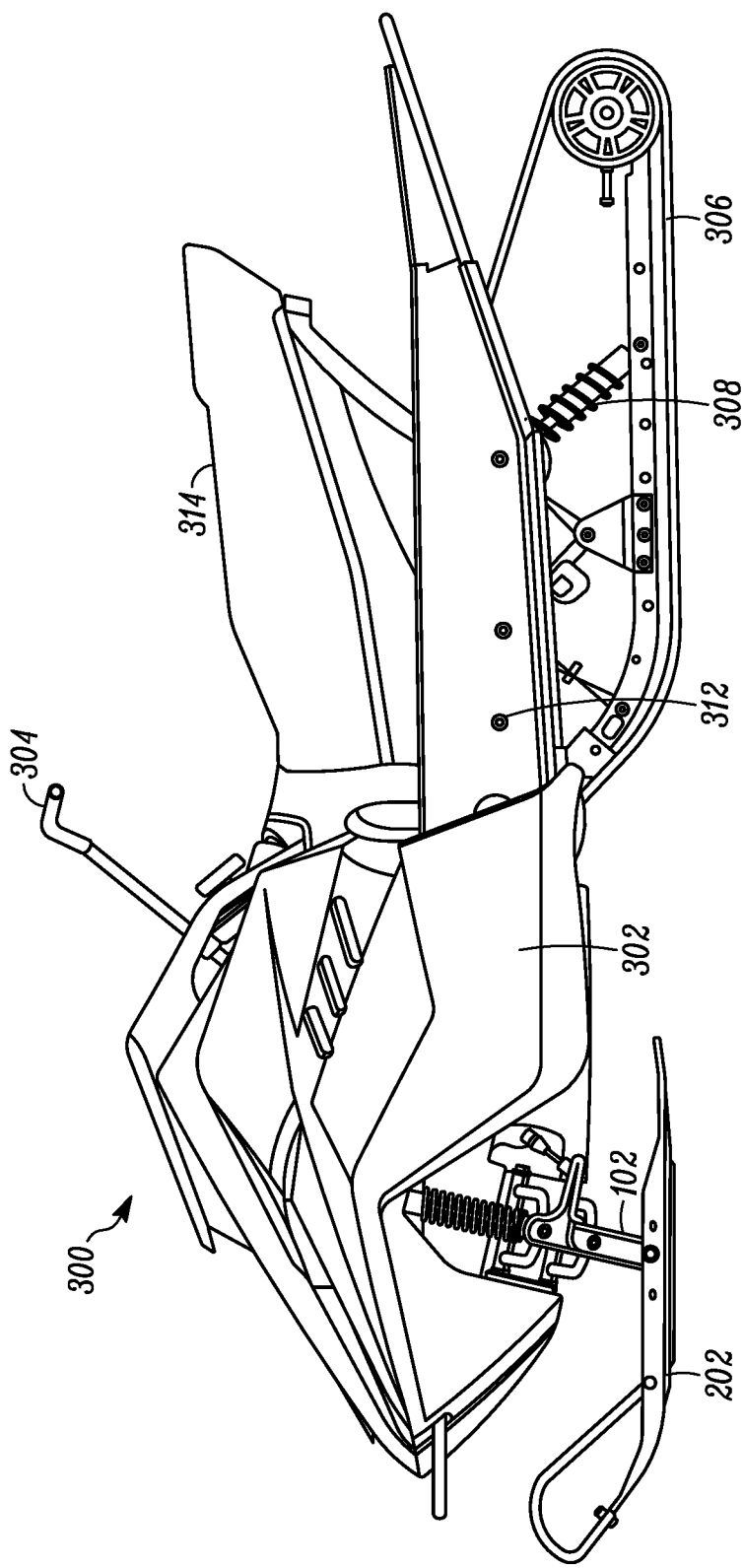
Figure 3D:
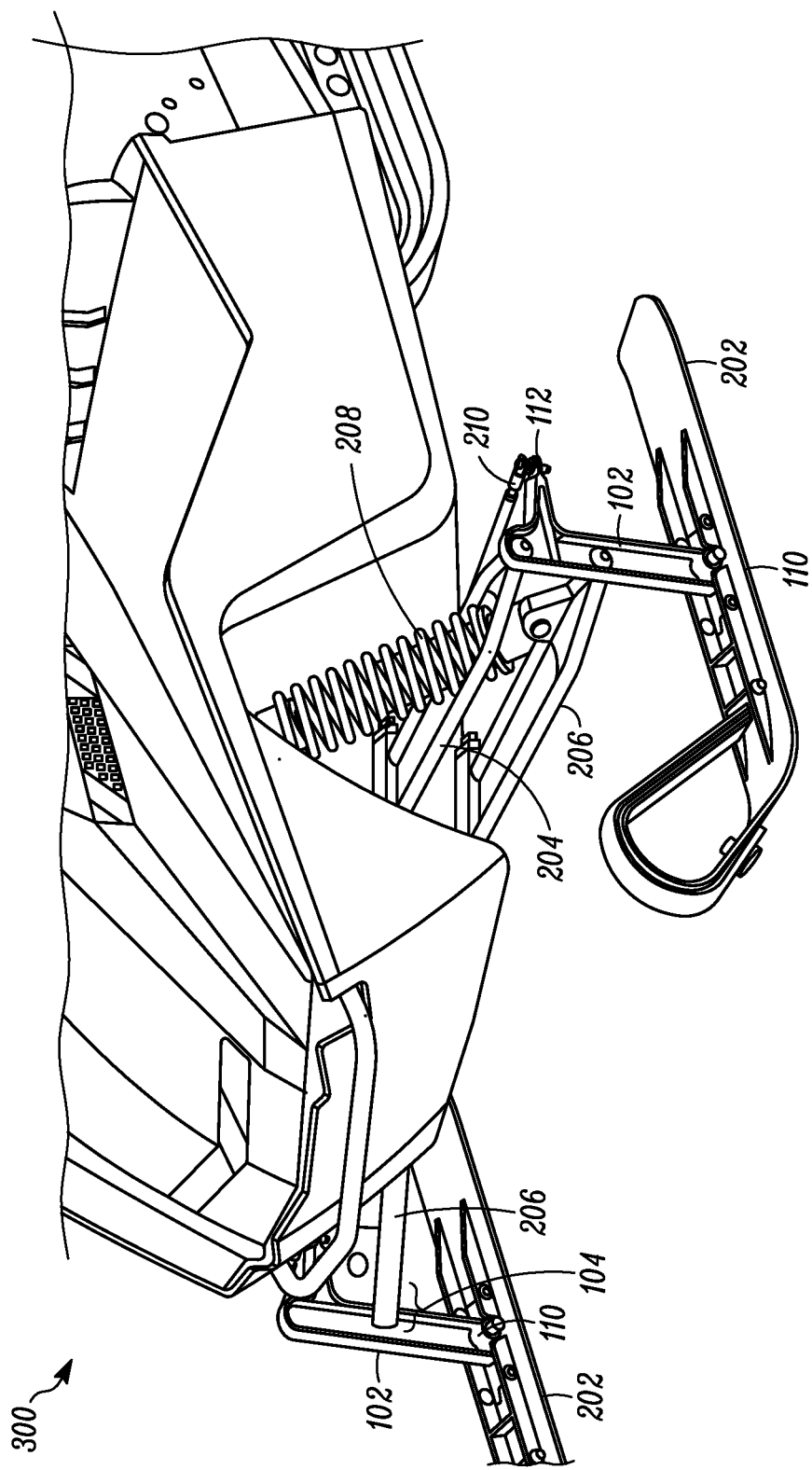
Figure 3E:
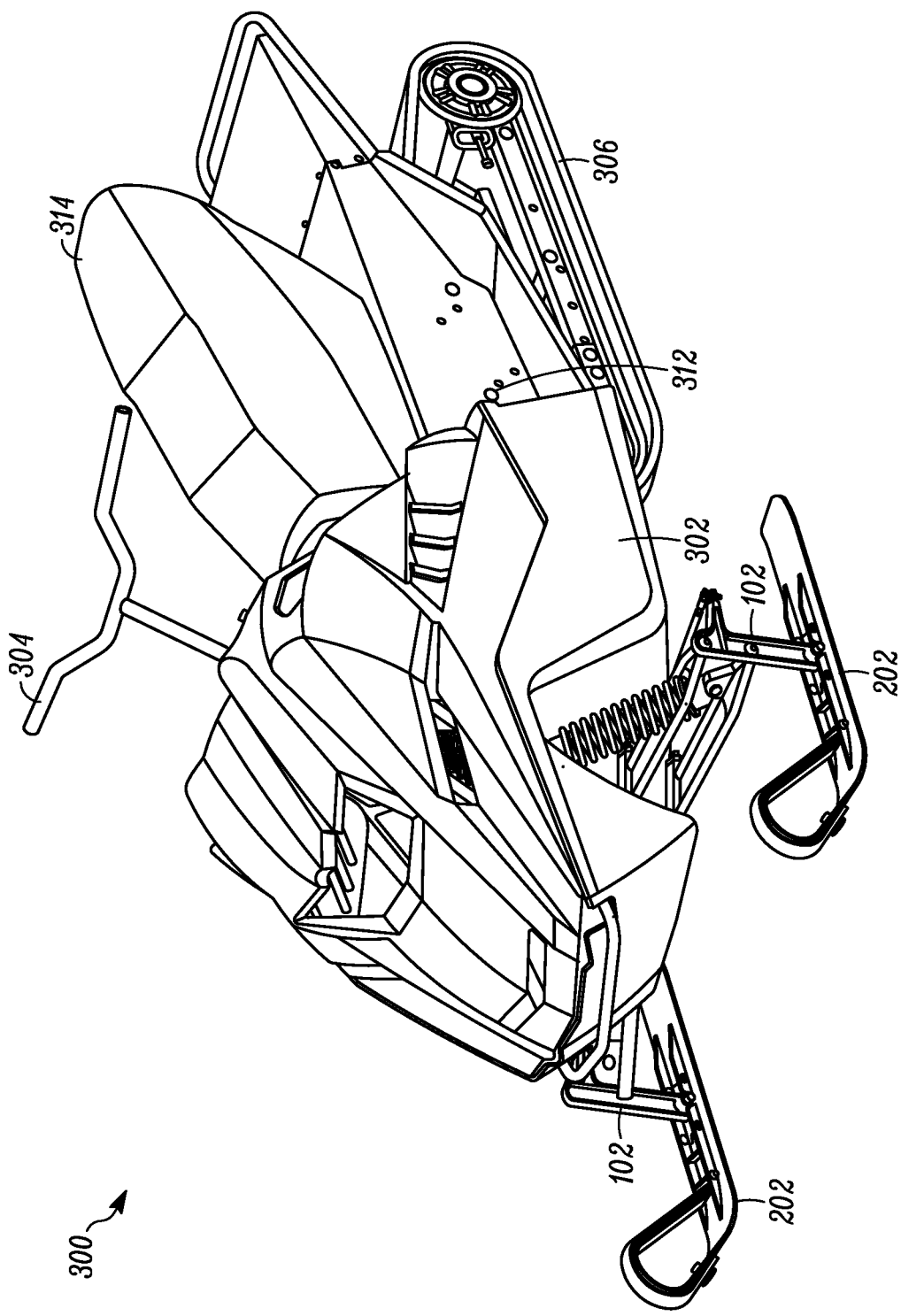

A spindle body 102 can be generally elongated in a vertical plane, substantially perpendicular to the ground. The spindle body 102 may be manufactured in a variety of shapes, so long as the shape allows the spindle body to structurally connect the ski or wheel of a vehicle and at least one of a steering component 210, a connecting arm 204, 206 and a dampening component 208 (as shown in FIG. 2). The spindle body 102 can include aesthetic features that can be optionally functional. Such aesthetic or functional features can include ridges, indentations, protrusions, overall shape, etc. The one or more sockets 106 can be positioned or formed in an upper portion of the spindle body 102, for example. The sockets 106 can be centrally located on the spindle body 102 or positioned in both an upper portion and lower portion of the spindle body 102. The sockets 106 can be in the same vertical plane or offset from each other. The spindle body 102 can include one socket 106, two sockets 106, or three or more sockets 106, for example. The socket 106 can include inner wall, in contact with a ball 114 and positioned generally facing an opposite spindle body 102. The socket 106 can include an outer wall, facing away from an opposing spindle body 102. The outer wall of the socket 106 can be flush with an outer wall of the spindle body 102. The outer wall of the socket 106 can optionally be protruding (e.g., non flush) from the outer wall of the spindle body 102. When formed, the outer wall of a socket 106 can be partially in-line with the outer wall of the spindle body and partially protruding from the outer wall of spindle body 102.

A cross section view of a spindle body 102 and ball joint 104 is shown in FIG. 1E. The ball 114 may be partially, substantially or wholly surrounded by or in contact with a bearing material 116, such as a polymer. The bearing material 116 can also be a metal or part of the spindle body 102 or socket 106, for example. The bearing material 116 can secure the ball 114, reduce friction for the ball 114 or both. An adjustment mechanism 118 may be positioned in contact with the ball 114. The adjustment mechanism 118 may be a hex key hole, for example. The ball 114 may be held in place at 118 with a tool for tightening of external nuts or other adjustments.

The socket 106 is capable of receiving a ball 114. The ball 114 is in contact with a stud 108. The socket 106, ball 114 and stud 108 form a ball joint 104. The ball 114 and stud 108 can be a single unit, such as from one-piece manufacturing. The ball 114 and stud 108 can be attached, such as by welding or screwing the stud 108 into the ball 114, for example. Further, the stud 108 can be attached to or formed with one or more of a connecting arm 204, 206, a steering component 210, and dampening component 208 (as shown in FIG. 2). If formed together or integrated, the stud 108 may simply refer to some portion of the component in contact with the ball 114. The ball 114 may be pressure fit or friction fit within the socket, so as to allow rotation about the socket 106 without dislodging the ball 114 from the socket 106. The ball 114 can be held in place by forming a portion of the spindle body 102 around the ball 114 after contacting with the socket 106, for example. The ball joint 104 formed reduces the free play or unintended movement of the ball 114 within or out of the socket 106. Excessive or increasing free play contributes to wear and ultimately to failure of the ball joint 104.

The upper attachment mechanism 112 can be positioned at any portion of the spindle body 102, so long as the mechanism 112 allows for attachment to a steering component 210 (as shown in FIG. 2). The upper attachment mechanism 112 can be positioned in the upper portion of the spindle body 102, central or mid-portion of the spindle body 102, or in the lower portion of the spindle body 102. The upper attachment mechanism 112 can be a bolt hole, threaded protrusion, threaded hole, protrusion for welding, protrusion for bolting, etc. A protrusion in the direction of the rear of the vehicle can create a position or mount for the upper attachment mechanism 112. The upper attachment mechanism 112 can be any mechanical attachment component that facilitates attachment to the steering component 210, such as a tie rod (as shown in FIG. 2). Similarly, the steering component 210 can include a complementary or facilitating configuration to attach to the spindle body 102.

The lower attachment mechanism 110 can be positioned at any portion of the spindle body 102, so long as the mechanism 110 allows for attachment to a ski 202 (as shown in FIG. 2) or wheel of a vehicle. The spindle body 102 can be positioned and attached to the ski 202 or wheel in a variety of angles and alignments, so long as the attachment is secure enough to translate movement of the skis 202 or wheels in response to movement of the steering component 210 at the upper attachment mechanism 212. Further, the attachment can be pivotal, such as by using a pivot pin to allow the ski 202 to rotate in one or more directions about the attachment 110. The lower attachment mechanism 110 can be positioned in the central or mid-portion of the spindle body 102 or in the lower portion of the spindle body 102. The lower attachment mechanism 110 can be any mechanical attachment component that facilitates attachment to the ski or wheel. The lower attachment mechanism 110 can be a bolt hole, threaded protrusion, threaded hole, protrusion for welding, protrusion for bolting, etc. Similarly, the ski or wheel can include a complementary or facilitating configuration to attach to the spindle body 102.

Referring to FIG. 2, a perspective view of a suspension system 200 is shown, according to an embodiment of this disclosure. The suspension system includes one or more spindle bodies 102. Each spindle body 102 includes one or more sockets 106 in the spindle body 102 and an upper attachment mechanism 112 attached to one or more steering components 210. Each spindle body 102 also includes a lower attachment mechanism 110 attached to a ski 202. The suspension system 200 also includes one or more connecting arms 204, 206, each connecting arm 204, 206 in contact with a stud 108 at a distal end, forming a ball joint 104 with each socket 106 of the spindle body 102. One or more dampening components 208 are also included and are in contact with one or more of the connecting arms 204, 206 and spindle body 102 at a distal end.

The steering component 210 ultimately connects to and is controlled by handlebars 304 or handlebar assembly. Various links and linkages (not shown) can connect the steering component 210 in contact with the upper attachment mechanism 112 and handlebars 304. The handlebar assembly, positioned forward of the seat, is operatively linked to the skis by one or more steering components 210 for steering the vehicle. The skis 202 or wheels may be pivoted laterally to steer the vehicle, for example, by turning the handlebars.

The connecting arms 204, 206 can include an upper connecting arm 204 and lower connecting arm 206, example. The connecting arms 204, 206 are in contact with at least one of the spindle body 102 and dampening component 208. At a distal end of the connecting arms 204, 206, the arms connect to a stud 108 of the ball joint 104 or some portion of the arms 204, 206 function as the stud 108 in the ball joint 104. At a proximal end, the connecting arms 204, 206 attach to or are integrated with the chassis 302. This connection can be pivotal or rotatable, for example. Connecting arms 204, 206 or suspension arms may be of the "trailing/leading arm" variety (not shown), employing an elongated structural member attached at its front or distal end to a spindle body 102, and pivotally attached at its rear or proximal end to the chassis 302 of the vehicle. Suspension arms may also be of the "A-arm" variety (shown), typically employing two A-shaped control arms 204, 206 that are pivotally mounted to the chassis 302 and connect to a spindle body 102 at a distal end. Combinations of A-arm and trailing/leading arm suspensions can also be utilized. In an optional embodiment, the connecting arms 204, 206 or suspension arms are formed with the ball joint 104 as one-piece construction. The arms 204, 206 can be attached to a stud 108, be attached to a ball 114, or formed with the stud 108 or formed with the ball 114, for example.

One or more dampening components 208 are in contact with at least one of the spindle body 102 and/or connecting arms 204, 206. The dampening components 208 can be shocks, springs, coils, etc. that absorb and convert energy while operating the vehicle in order to make the ride smoother and more predictable for the operator or user.

Referring to FIGS. 3A-E, perspective views of a suspension system in a recreational vehicle 300 are shown, according to an embodiment of this disclosure. The recreation vehicle includes one or more spindle bodies 102. Each spindle body 102 includes one or more sockets 106 in the spindle body 102 and an upper attachment mechanism 112 attached to one or more steering components 210. Each spindle body 102 also includes a lower attachment mechanism 110 attached to a ski 202. The vehicle 300 also includes one or more connecting arms 204, 206, each connecting arm 204, 206 in contact with a stud 108 and ball 114 at a distal end, forming a ball joint 104 with each socket 106 of the spindle body 102, and attached to a chassis 302 at the proximal end. The chassis 302 in FIGS. 3A-E is generally positioned underneath the shroud or fairing, seat, etc. One or more dampening components 208 are also included and are in contact with one or more of the connecting arms 204, 206 and spindle body 102 at a distal end, and attached to the chassis 302 at a proximal end. The vehicle 300 also includes an engine (not shown), mounted on the chassis 302. A drive track 306 is in contact with the chassis 302 and a drive train 312 is operatively interconnecting the engine with the drive track 306 for delivering propulsive power to the drive track 306. Also included is a rear suspension system 308, in contact with at least the chassis 302 and drive track 306.

In general, a recreational vehicle, such as a snowmobile, has a central chassis 302 on or around which the various components of the snowmobile are assembled. Typical snowmobiles include skis 202 for steering, a seat 314, handlebars 304, and an endless track (drive track 306) for propulsion mounted to a central chassis 302. An engine cradle or bulkhead (not shown) is defined by a plurality of front structural members of the chassis. The engine (not shown) drives a ground-engaging endless track (drive track 306) disposed in a longitudinally extending drive tunnel formed within the chassis 302. The skis 202 serve to facilitate steering as well as to provide flotation of the front of the snowmobile over the snow in which it is operated. The skis 202 are mounted at the front body portion of the chassis.

Drive train 312 facilitates and controls power from the engine to the drive track 306. The drive train 312 includes a transmission or clutch system, for example. A rear suspension system 308 absorbs and converts energy to reduce shock impulses from the drive track 306 meeting uneven surfaces.

Figure 4:
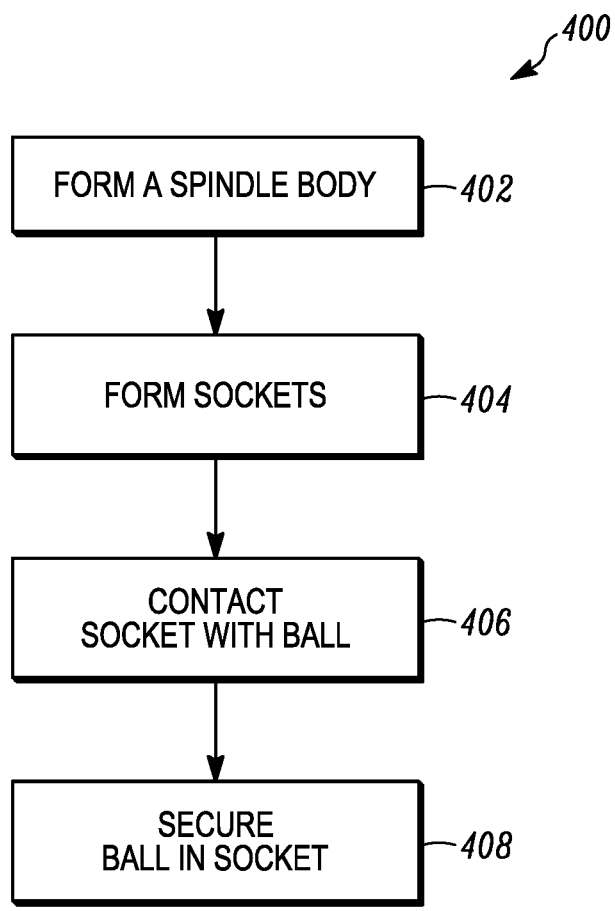
FIG. 4 illustrates a block flow diagram of a method of making a spindle, according to an embodiment of this disclosure.

Referring to FIG. 4, a block flow diagram of a method 400 of making a spindle is shown, according to an embodiment of this disclosure. A spindle body is formed 402. On or more sockets are formed 404 in the spindle body. Each of the sockets is contacted 406 with a ball. The ball is then secured 408 within each socket.

In some embodiments, the spindle body 102 is cast, forged, or molded of a single piece of material, for example aluminum or steel, and the sockets 106 are formed in the spindle body 102. The sockets 106 can be formed in the spindle body 102 during the forming process making the spindle body 102 or they can be subsequently added to the spindle body 102. In some embodiments, the sockets 106 define a spherical or semi-spherical cavity. The spindle body 102 can be hardened via a hardening process. Subsequently, in at least some embodiments, the ball(s) 104 is/are placed into socket(s) 106. Thereafter, the bearing material, is molded around the ball(s) 104. In some embodiments, the bearing material is a polymeric material having a desired coefficient of friction. In some embodiments, the polymeric material is Delrin, however other thermosets or thermoplastics can be utilized. In some embodiments, the bearing material is injected around the ball 104 between the socket 106 and the ball 104.

Forming 402 a spindle body can include utilizing metal fabrication or metal molding to form the spindle body shape, for example. Metal fabrication includes one or more of laser, plasma, flame and saw cutting, metal machining, computer numeric control (CNC) machining, chiseling, bending, robotic and manual welding. Bending is done by hammering (manual or powered) or via press brakes and similar tools. Assembling (joining of the pieces) is done by welding, binding with adhesives, riveting, threaded fasteners, or additional bending in the form of a crimped seam. Structural steel and sheet metal are often used as starting materials for fabrication, along with the welding wire, flux, and fasteners that will join the cut pieces. Metal molding, such as metal injection molding can be utilized. Metal casting and extrusion are further examples of forming 402.

During or after the process of forming 402 the spindle body, one or more sockets are formed 404 in the spindle body. The sockets can be formed 404 contiguous and simultaneously with the spindle body, or after some portion or all of the spindle body is formed 402. In addition to, or alternatively to, using steel, the materials used to manufacture the spindle body and sockets include one or more of carbon steel, aluminum alloys, aluminum, steel, magnesium, composite materials, and titanium alloys.

After forming 404 the sockets, each socket is contacted 406 with a ball and then secured 408, to form a ball joint. Contacting 406 can include a pressure or friction fit, for example. The ball may be contacted 406 with the socket during forming 404 and tabs or protrusions created or formed around the socket and ball to secure 408 the ball within the socket, for example.

Figure 5B:
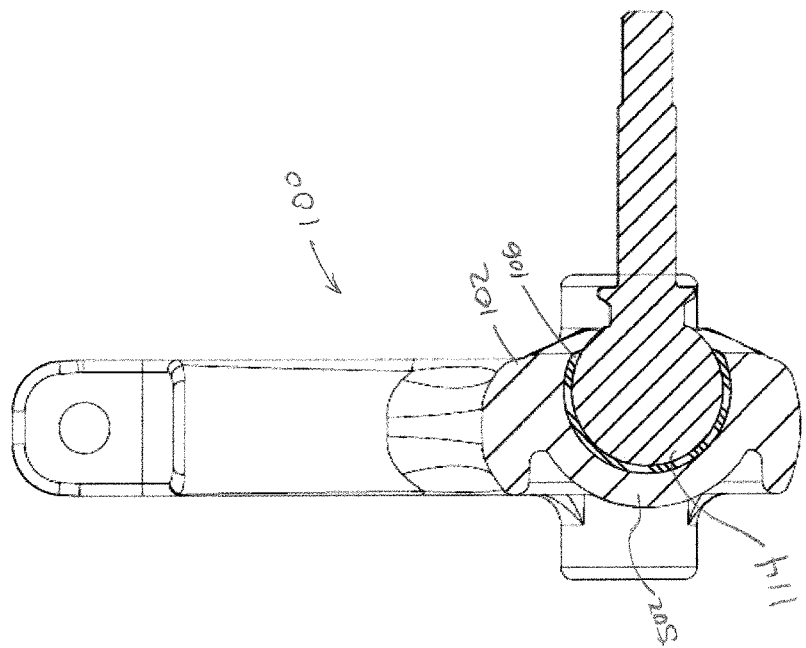
FIG. 5B illustrates a cross-sectional view of a spindle, according to an embodiment of this disclosure.
Figure 5A:
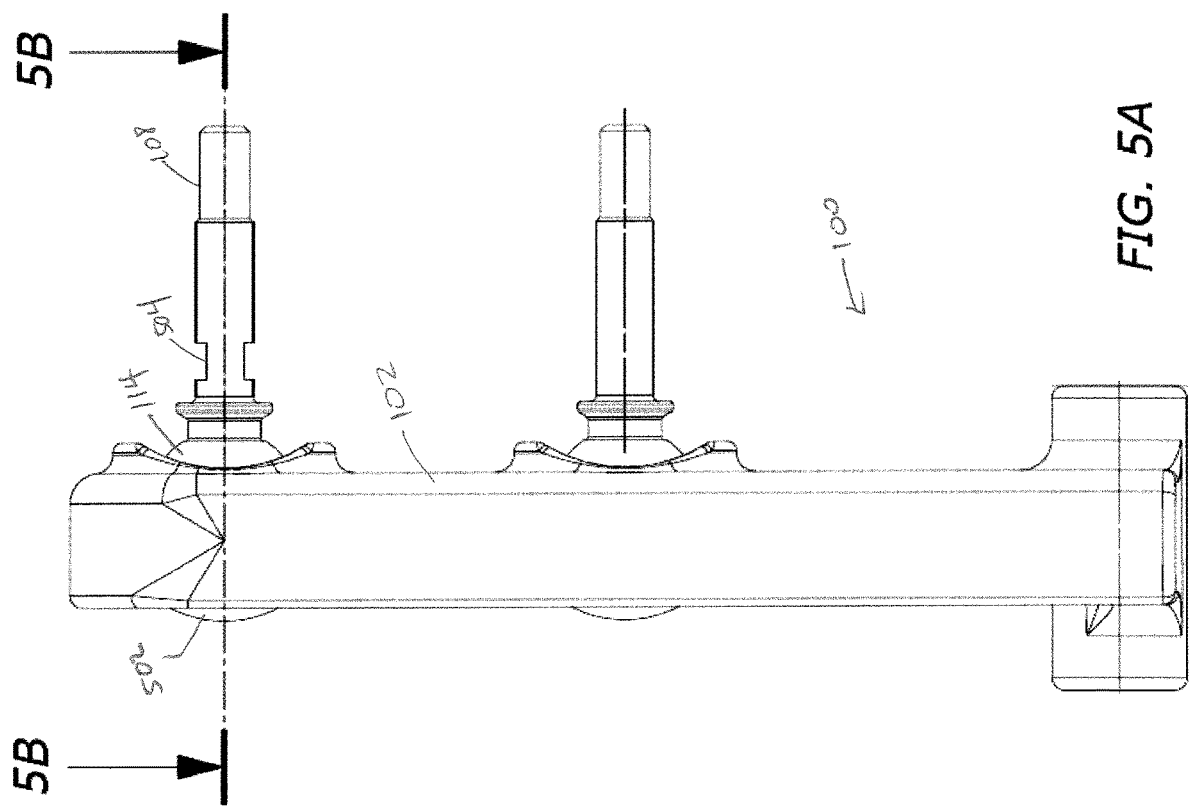
FIG. 5A illustrates a perspective view of a spindle, according to an embodiment of this disclosure.

Turning to FIGS. 5A and 5B, an embodiment of the spindle 100 is shown, wherein the spindle body 102 has a wall portion 502, such that the ball 114 does not protrude from the spindle body 102 on both sides thereof. The ball 114 can protrude from either or both sides of the spindle body 102 by any desired amount so long as the ball 114 is retained. Referring to FIG. 5A, in some embodiments, one or more portions of one or more of the studs 108 includes a flat 504 where a wrench (e.g., an open end wrench) can be located such that a nut (not shown) can be tightened against the stud 108. Although the flat 504 is shown in FIG. 5A with a smaller cross sectional area than the adjacent portion of the stud 108, it will be appreciated that the flat 504 can have a larger cross sectional area than the adjacent portion of the stud 108. In some embodiments, the flat 504 is formed from a hexagonal portion, for example that is integrally formed with the 108.

In some embodiments, the ball 114 is (which can be formed with the stud 108 from a single piece of material) is placed within the socket 106 using a jig. Thereafter, the bearing material 116 is injected into the socket 106 around the ball 114. The bearing material 116 then hardens such that the ball 114 cannot escape from the socket 106.

Figure 6A:
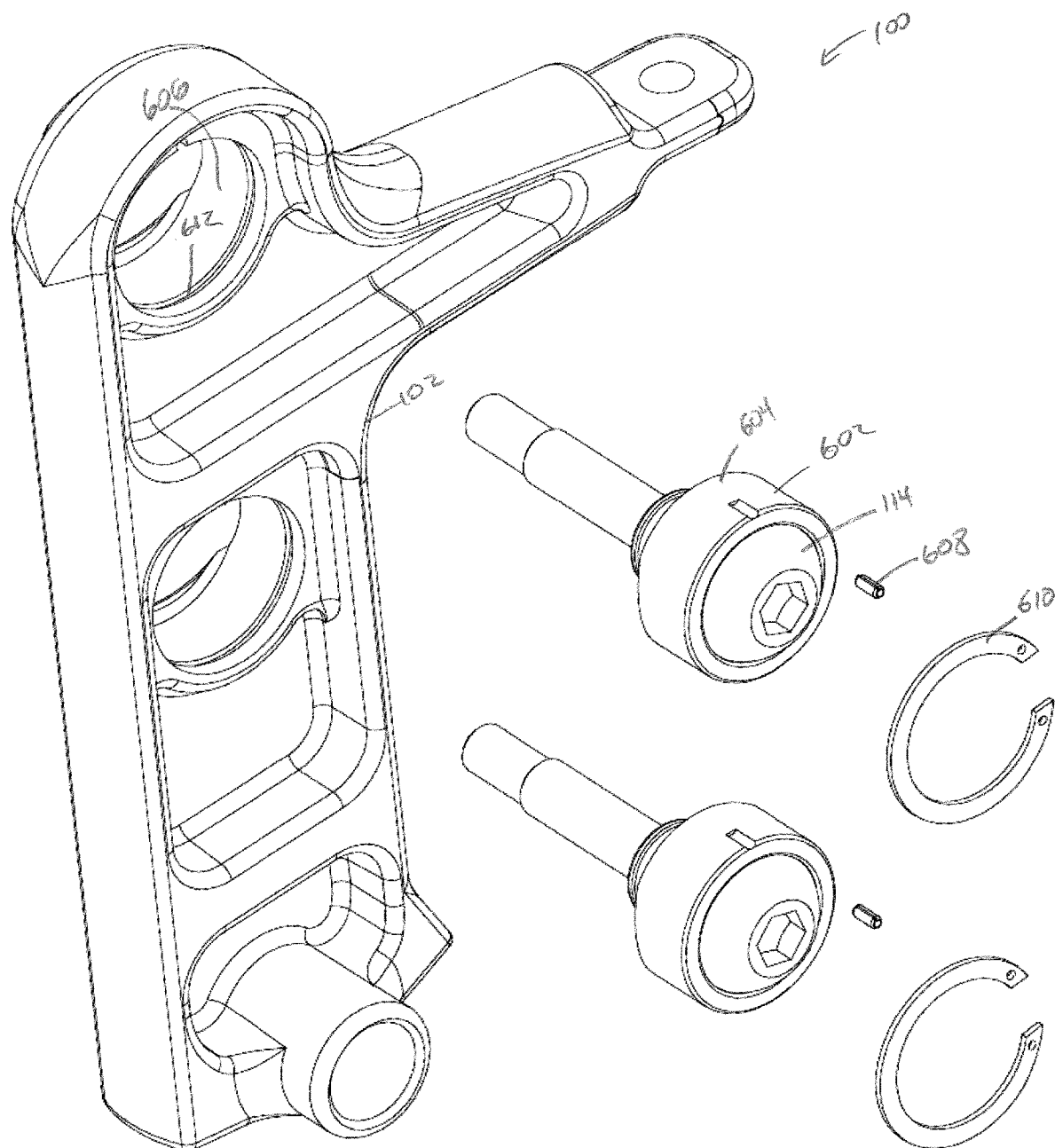
FIG. 6A illustrates an exploded view of a spindle, view of a spindle, according to an embodiment of this disclosure.
Figure 6B:
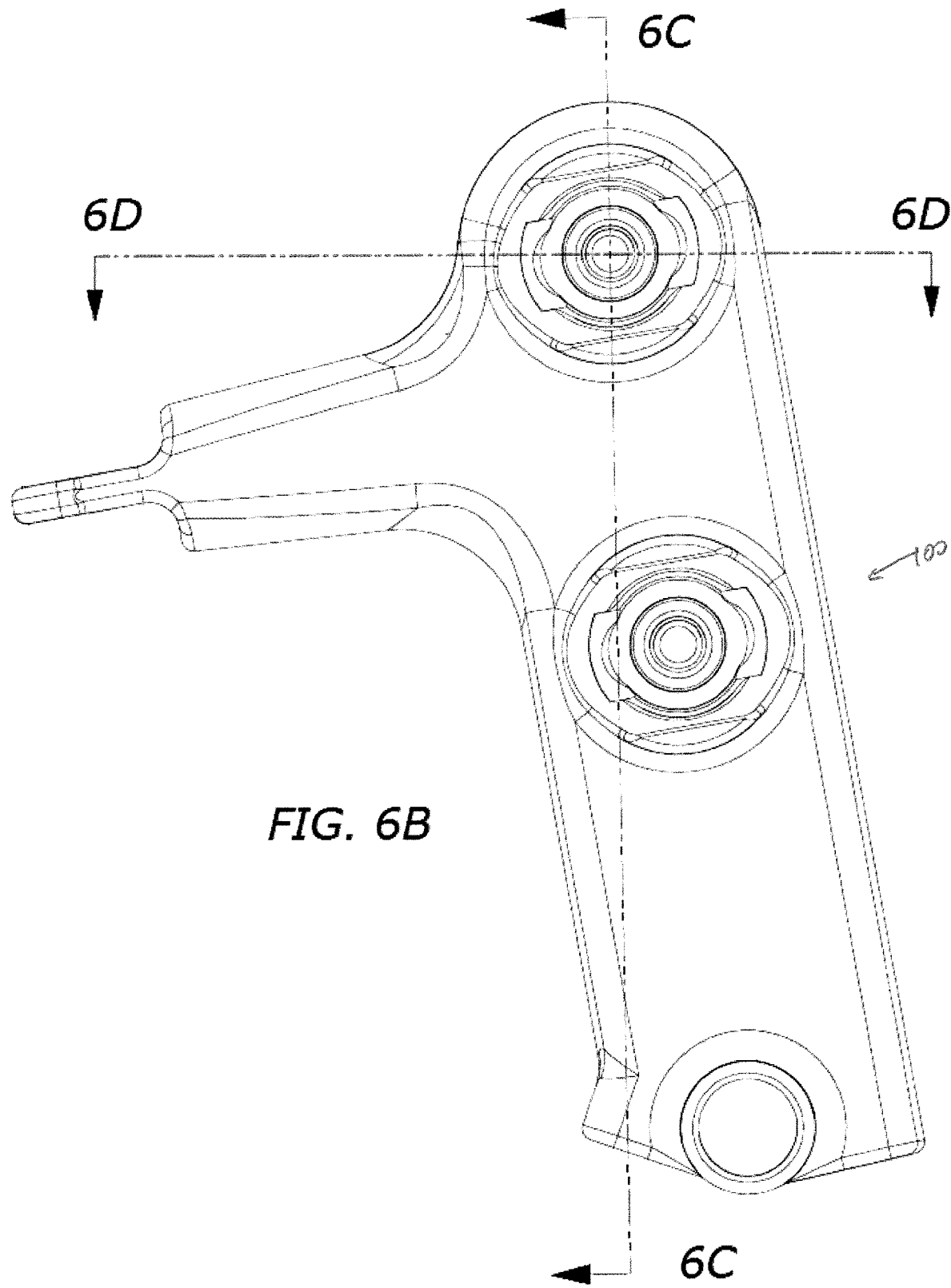
FIG. 6B illustrates a perspective view of a spindle, according to an embodiment of this disclosure.
Figure 6C:
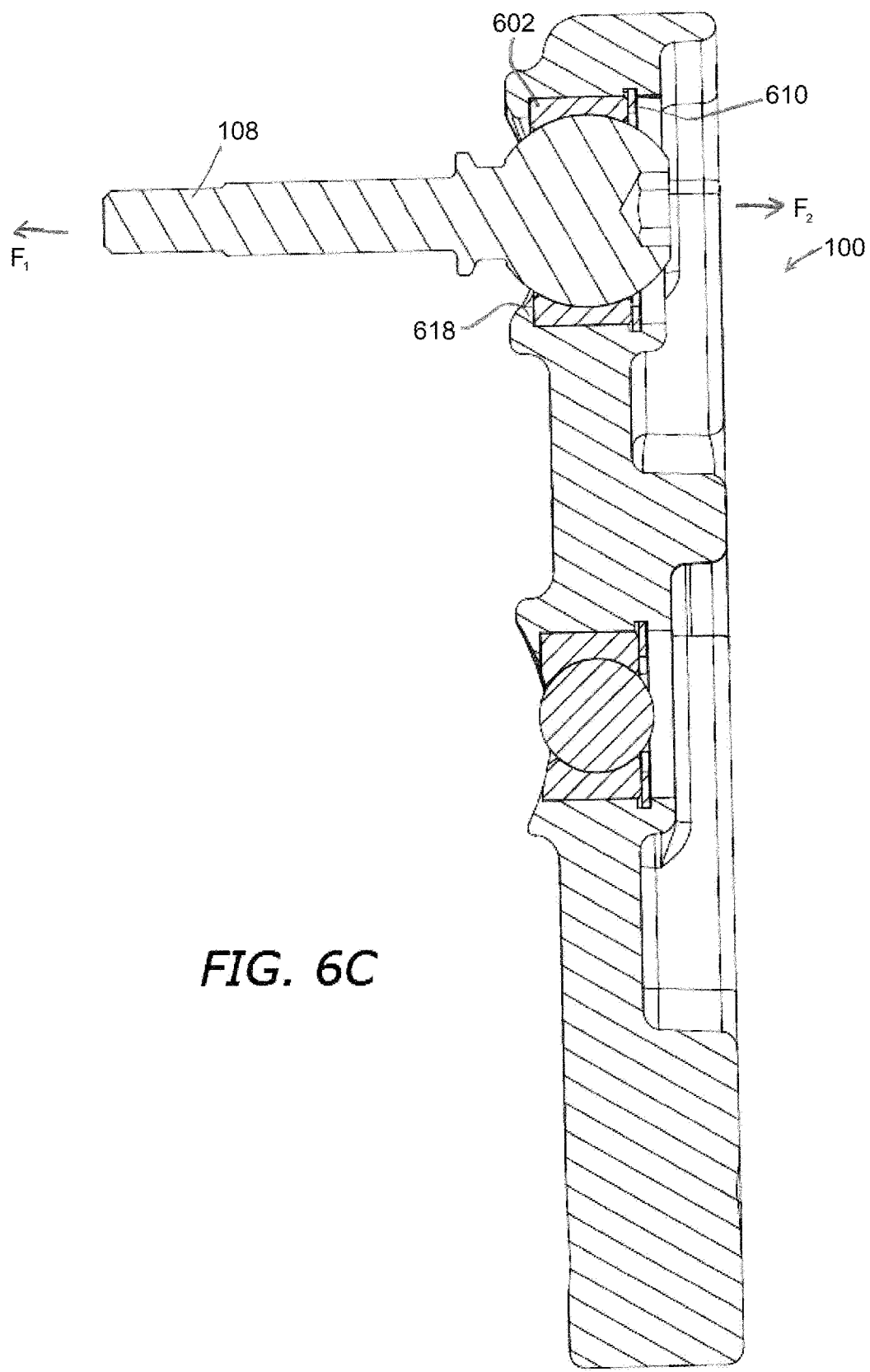
FIGS. 6C-D illustrate cross-sectional views of a spindle, according to an embodiment of this disclosure.
Figure 6D:
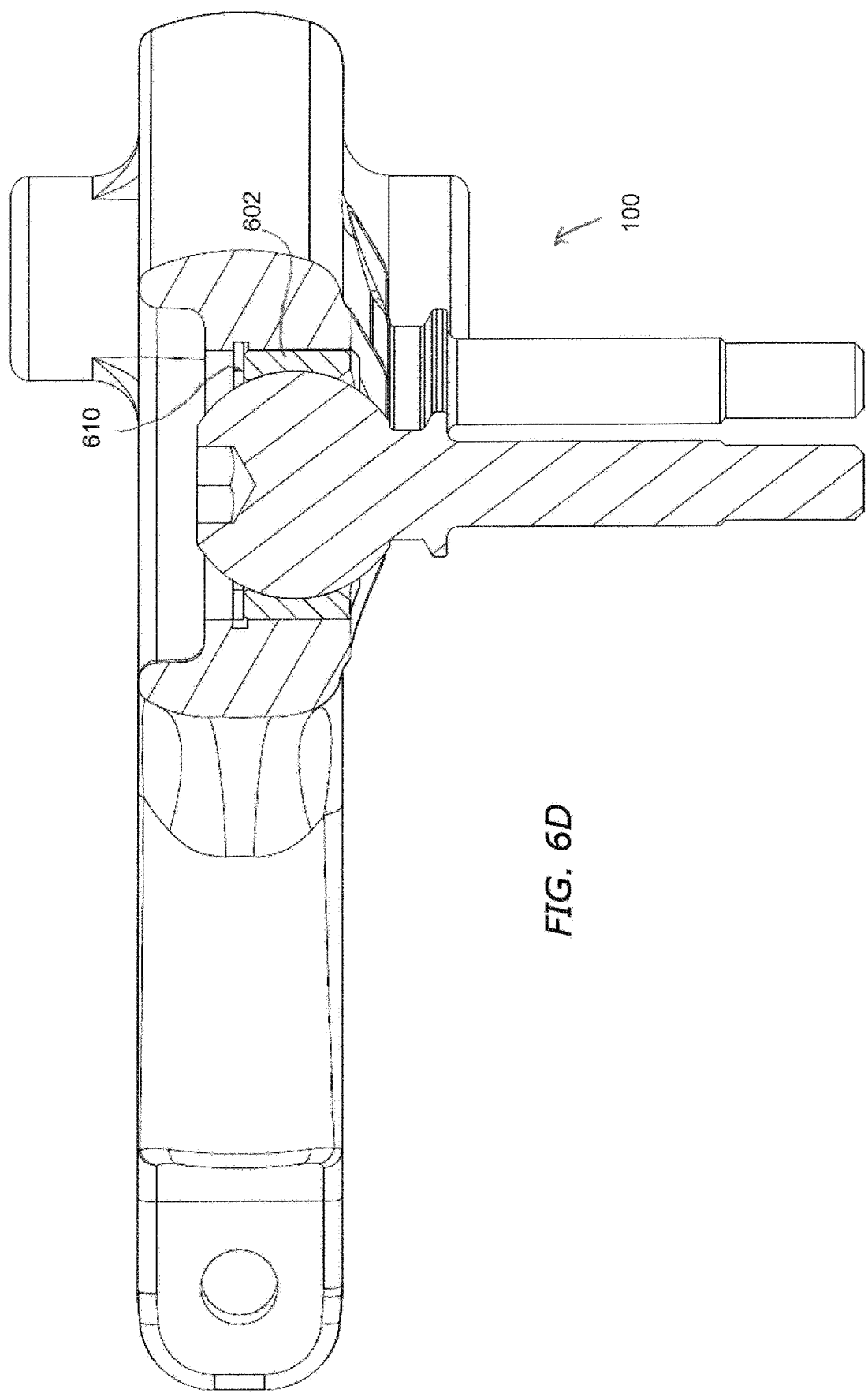

With regarding to FIGS. 6A-6D, an embodiment of the spindle 100 is shown. As shown in FIG. 6A, in some embodiments, a ball retainer 602 retains the ball 114 therein. In turn, the ball retainer 602 has, in some embodiments, a generally cylindrical outer portion 604 which is seated within a cavity 606. In some embodiments, a pin 608 is pressed into a portion of the ball retainer 602 and a portion of the spindle body 102. In some embodiments, the pin 608 prevents movement (e.g., rotation) of the ball retainer 602 within the cavity 606. In some embodiments, a retaining clip 610 (e.g., spring clip, c-clip, etc.) is located in a groove 612, as shown in FIGS. 6C and 6D. The retaining clip 610 prevents the ball retainer 602 from coming out of the cavity 606 (e.g., when a pushing force is applied to the stud 108 in the direction of $F_2$, as shown in FIG. 6C). Further, as shown in FIG. 6C, in some embodiments, the spindle body 102 has a shoulder 618 which prevents the ball retainer 602 from coming out of the cavity 606 (e.g., when a pulling force is applied to the stud 108 in the direction $F_1$).

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto Various examples have been described. These and other examples are within the scope of the following claims.

What is claimed is:

1. A method of making a recreational vehicle spindle, comprising:
   forming a spindle body, the spindle body including an upper attachment mechanism configured to couple with a steering component and a lower attachment mechanism configured to couple with a ski or a wheel;
   forming one or more sockets in the spindle body, each of the one or more sockets including an inner wall and an outer wall;
   positioning a ball within each of the sockets; and
   removably securing the ball within each socket.

2. The method of claim 1, wherein forming a spindle body comprises fabricating a spindle body.

3. The method of claim 1, wherein forming a spindle body comprises molding a spindle body.

4. The method of claim 1, wherein forming a spindle body and forming one or more sockets is substantially simultaneous.

5. The method of claim 1, wherein securing the ball comprises one or more of a pressure fit and friction fit.

6. The method of claim 1, wherein securing the ball comprises forming material around the ball after contacting the socket with the ball.

7. The method claim 1, further comprising the step of hardening the spindle body via a hardening process.

8. The method of claim 1, wherein securing the ball within each socket comprises positioning the ball such that removal of the ball is accomplished without breaking a weld.

9. The method of claim 1, wherein securing the ball within each socket comprises positioning the ball such that removal of the ball is accomplished without damaging the socket.

\* \* \* \* \*